United States Patent
Erickson

(10) Patent No.: US 6,585,238 B1
(45) Date of Patent: Jul. 1, 2003

(54) LOCALLY CO CURRENT HORIZONTALLY STAGED CONTACT TRAY

(76) Inventor: Donald C. Erickson, 1704 S. Harbor La., Annap., MD (US) 21401

(*) Notice: Subject to any disclaimer, the term of this patent is extended or adjusted under 35 U.S.C. 154(b) by 0 days.

(21) Appl. No.: 09/519,277

(22) Filed: Mar. 7, 2000

(51) Int. Cl.[7] .................................................. B01F 3/04

(52) U.S. Cl. .................................. 261/114.1; 261/114.5

(58) Field of Search ............................. 261/114.1, 114.5

(56) References Cited

U.S. PATENT DOCUMENTS

| | | | | |
|---|---|---|---|---|
| 2,327,993 A | * | 8/1943 | Bragg | 261/114.1 |
| 3,062,517 A | * | 11/1962 | Voetter et al. | 261/114.1 |
| 3,162,700 A | * | 12/1964 | Irons | 261/114.1 |
| 3,434,701 A | * | 3/1969 | Bauer | 261/114.1 |
| 4,032,410 A | * | 6/1977 | Kuxdorf et al. | 261/114.5 |
| 4,496,430 A | * | 1/1985 | Jenkins | 261/114.5 |
| 4,556,522 A | * | 12/1985 | Wilson | 261/114.1 |

FOREIGN PATENT DOCUMENTS

| | | | | |
|---|---|---|---|---|
| DE | 1154072 A | * | 9/1963 | 261/114.1 |
| FR | 379037 A | * | 10/1907 | 261/114.1 |

* cited by examiner

Primary Examiner—C. Scott Bushey

(57) ABSTRACT

A vapor-liquid tray is provided which achieves markedly higher vapor loading and tray efficiency at all liquid loadings, and with little or no increase in pressure drop. Vapor loading is increased via a multiplicity of locally co-current liquid recirculating compartments, preferably with diagonal structure producing diagonal co-currency. Tray efficiency is increased by highly effective horizontal staging via a convergent-divergent liquid flowpath, preferably with structurally integrated tray downcomers. The advantageous features are also applicable individually. Referring to FIG. 16, symmetric tray partitions 1602 separate the active area of tray 1601 into a central section and two peripheral sections. The peripheral sections have tray downcomers 1615 and tray weirs 1617. The central section tray weir is 1632. Compartment partitions 1613 divide the liquid flowpaths into multiple compartments, each having compartment weir 1613 with liquid recirculation passages 1633.

6 Claims, 9 Drawing Sheets

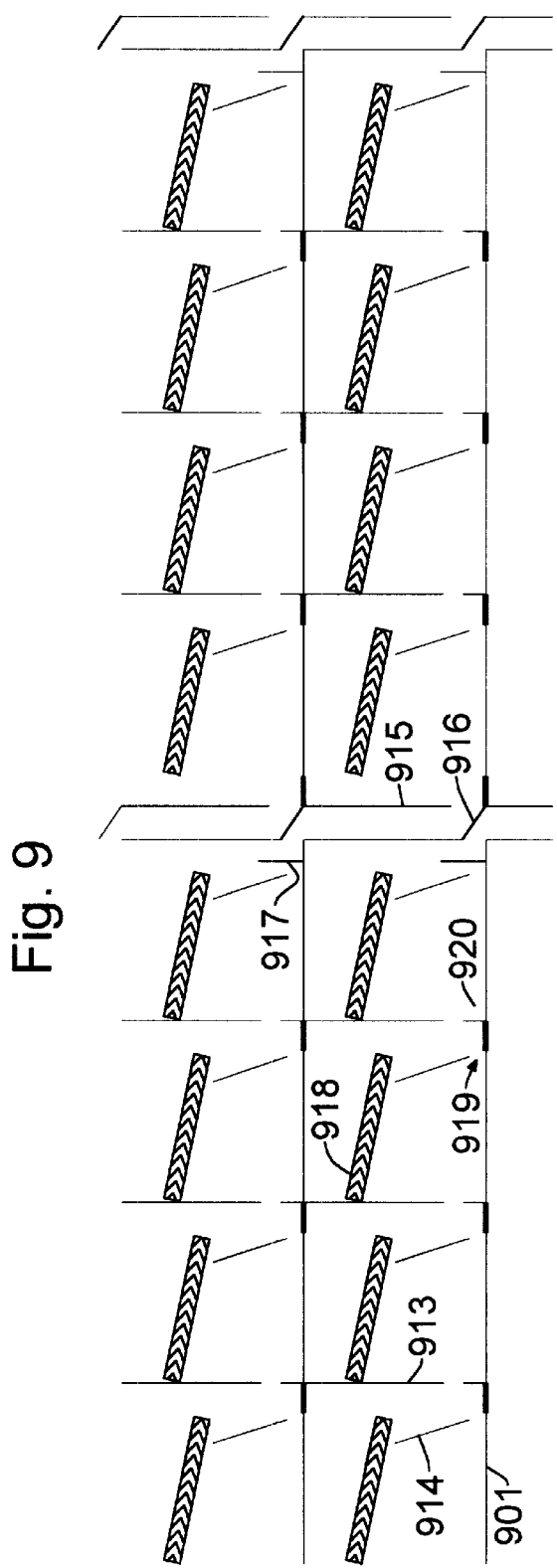

LOCALLY CO CURRENT HORIZONTALLY STAGED CONTACT TRAY

TECHNICAL FIELD

The invention is directed toward multistage vertical tray-type vapor-liquid contactors which find use in a variety of equipment and industrial processes such as fractional distillation, absorption, desorption, stripping, mixing, and partial condensation (dephlegmation).

BACKGROUND

Multicomponent fluid vapor-liquid contactors of the tray or plate type have several known limitations which result in columns having large diameter, large height, high cost, high-energy demand, and high-pressure drop. There is a continuing search for higher vapor-liquid contact column capacity (loading), higher efficiency (both tray and column), and lower pressure drop.

Column or tray loading can be increased by any or all of: increasing the active area; decreasing the downcomer area (and especially avoiding the dual downcomer penalty); increasing the weir length; increasing the number of downcomers (and decreasing thereby the liquid path length); and finally, by avoiding the flooding limitation, e.g., by having tray sections which are locally co-current, i.e., locally flooded, with other tray sections relieving the flooding. See, for example, U.S. Pat. No. 5,798,086.

Tray efficiency can be increased by increasing point efficiency, by extending the fluid contact time as froth, and also by horizontal staging of the liquid flow across the tray. Different liquid flow directions and degrees of vapor mixing yield differing tray enhancements, with same direction liquid flow coupled with no vapor mixing yielding the greatest enhancement.

Column pressure drop can be decreased by reducing the total tray count (made possible by increased tray efficiency) and/or by reducing the tray pressure drop, and by reducing liquid height and/or vapor flow restrictions.

Some trays have one downcomer area for arriving liquid, and a completely separate downcomer area for departing liquid. A preferred arrangement is to integrate the arriving downcomer and departing downcomer into the same area, thus avoiding the dual downcomer penalty. Frequently this results in identical downcomer arrangements on adjacent trays, in contrast to the more usual mirror image relationship between adjacent trays. This integrated arrangement is possible in part because the arriving liquid requires much less area than the departing liquid, since the latter also requires phase separation from the froth. The integrated downcomer however would preferably have a positive liquid seal, not a dynamic one, i.e., should preferably have a reverse (inlet) weir extending to approximately below the quiescent tray liquid level. This is because downcomers with dynamic liquid seals have very limited turndown capability.

One problem frequently encountered is that measures which improve one of the above parameters or solve one of the above problems have the undesirable side effect of worsening others. For example, several designs which incorporate multiple tray downcomers to accommodate higher liquid loading also result in very short and irregular liquid flowpaths. This eliminates most of the horizontal staging benefit, and thereby decreases tray efficiency. In effect, column diameter is decreased, but tray count and column height must as a result be increased. Another example of undesirable side effect is provided by some tray designs which incorporate locally co-current sections to increase vapor loading. In one of those (U.S. Pat. No. 5,695,548), the local co-currency causes both loss of all horizontal staging and also the dual downcomer penalty. In three others (U.S. Pat. Nos. 5,110,325 and 2,693,350, plus International Publication WO99/54018), horizontal staging is preserved, but at the expense of very substantial froth-free or spray-free areas on the tray, in addition to the dual downcomer penalty. Any froth-free areas have the effect of reducing residence time of contact between vapor and liquid and hence reducing point efficiency and tray efficiency. Also, tray pressure drop is increased in some by providing only limited area for co-current contact, and by requiring major changes in vapor direction. Finally, only the less desirable opposite direction liquid flow type of horizontal staging is achieved. In summary, prior art teachings of increasing tray vapor capacity via local co-currency have the unintended consequence of reducing active area, point efficiency, and/or tray efficiency.

Additional examples of undesired side consequences arising from measures to increase some performance parameter are provided by the multiple downcomer disclosures, e.g., U.S. Pat. Nos. 5,098,615 and 5,318,732. In the former, as indicated above, multiple downcomers are positioned at right angles on adjacent trays, thereby providing greater liquid loading, but resulting in short and erratic liquid paths and hence loss of all tray efficiency benefit from horizontal staging. The latter disclosure partially corrects this by establishing orderly same direction flow on adjacent trays, and by avoiding the dual downcomer penalty, but with liquid flowpaths of such variable width and length that substantial liquid mixing occurs, and hence only minimal horizontal staging benefit is achieved. Unrestricted vapor mixing above each liquid flowpath further reduces the benefit. The dynamic seals in the downcomers increase active area but restrict turndown, and make startup more difficult.

What is needed, and among the objects of this invention, are process and apparatus for tray crossflow vapor-liquid contact, which simultaneously achieve both higher efficiency and higher capacity, without adverse consequences such as those described above. Horizontal staging should be preserved, preferably the same direction liquid flow type, and the dual downcomer penalty should preferably be avoided. A maximum amount of tray area should be covered with froth.

DISCLOSURE OF THE INVENTION

The above and additional useful objects are obtained by providing an advanced locally co-current vapor liquid contact tray of the liquid crossflow type which is comprised of three advantageous features:

the tray downcomers have both arriving liquid and departing liquid integrated in a common structure, and have a positive liquid seal;

the tray is comprised of horizontally arrayed locally co-current liquid recirculating compartments, with compartment partitions which restrict liquid mixing between adjacent compartments and with non-vertical structure which increases tray surface active vapor injection area; and the liquid flowpath(s) on the tray have a convergent-divergent (CD) structure: converged flow through a central portion of the tray, and diverged flow back around two approximately mirror image outer portions, with one or more tray downcomers in the liquid path, and with liquid flow the same direction on adjacent trays.

The maximum tray performance advantage is obtained by additionally providing: vapor partitions which restrict vapor mixing between compartments; diagonally locally co-current flow; and for vapor-liquid separation structure in the top portion of each compartment, angled to drain liquid to the compartment downcomer.

Accordingly, the tray achieves increased vapor loading; increased liquid loading (proportional to the number of tray downcomers); high point efficiency due to maximum froth area and volume; even higher tray efficiency due to same direction flow with close approach to plug flow and with little mixing; maximum overall active area by avoidance of the dual downcomer penalty plus full use of both tray center and tray periphery; excellent turndown capability due to positive liquid seals; and little or no additional tray pressure drop. The performance enhancements are achieved without the traditional accompanying negative consequences.

Normally in vapor-liquid contact columns the design fluid loadings vary appreciably in different column sections. Thus, most or all of the above features would be appropriate in the heaviest loaded column sections, but not necessarily elsewhere (unless column diameter is reduced in the lightly loaded sections). Accordingly, not all of the above novel features will be required on other trays: sufficient advantage will be achieved with only certain subsets of those features, dependent upon the specifics of the fluid contacting being performed. Thus, some trays may require only the convergent-divergent liquid flowpath (with or without horizontal compartmentation); some may require only horizontal compartmentation with integrated tray downcomers (with either same direction or opposite direction liquid flow); and some may require only the high active area locally co-current liquid recirculated (LCLR) compartmentation with non-vertical structure, for example, diagonally co-current risers, again with same or opposite direction flow.

In particular, what is claimed is:

A vapor-liquid contact apparatus comprised of at least two crossflow trays, each tray comprised of at least three horizontal compartments—a liquid entry compartment, a liquid exit compartment, and at least one connecting compartment; a tray downcomer which routes liquid from the liquid exit compartment of the upper tray to the liquid entry compartment of the lower tray; plus a tray downcomer for the lower tray which is structurally integrated with the upper tray downcomer, wherein the liquid exit and liquid entry compartments are separated by said structurally integrated downcomers.

A vapor-liquid contact tray of the liquid crossflow type comprised of a multiplicity of horizontally disposed compartments which are separated by compartment partitions oriented transversely to the liquid flowpath; a weir within each compartment which separates the compartment into a riser area and a downcomer area; vapor injection openings on the portion of the tray under the riser area; passage for liquid flow under said weir; passage for liquid flow through the bottom portion of said compartment partitions; and wherein the downcomer area between weir and partition is larger at the top of the weir than at the bottom of the weir, by at least 50%.

A vapor-liquid contact tray of the crossflow type comprised of two tray partitions which divide the tray area into a central section plus two outer portions; vapor injection openings in all three of said tray areas; plus at least one tray downcomer which is located in at least one of said central section and said outer portions.

A tray-type vapor-liquid contact apparatus comprised of a multiplicity of inclined liquid recirculating downcomers on each tray.

BRIEF DESCRIPTION OF THE DRAWINGS

FIG. 9 is an elevation cross-section of one embodiment of the intensified LCLR compartment, having a diagonal weir to increase active area, and also with integrated tray downcomer and same direction liquid flow across each tray.

BEST MODE FOR CARRYING OUT THE INVENTION

Figure 1:
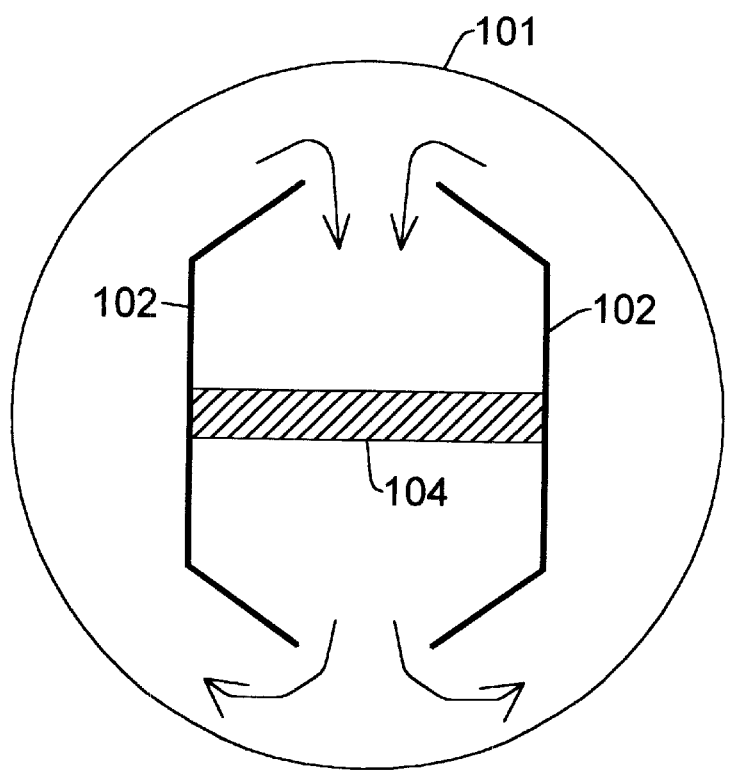
FIG. 1 is a simplified plan view of a convergent-divergent (CD) tray with a central downcomer only, and hence having a clear periphery.

Referring to FIG. 1, vapor injection tray 101 has mounted upon it two tray partitions 102, which separate the active vapor injection area into a central region and two peripheral regions. Tray downcomer 104 is located in the central region.

Figure 2:
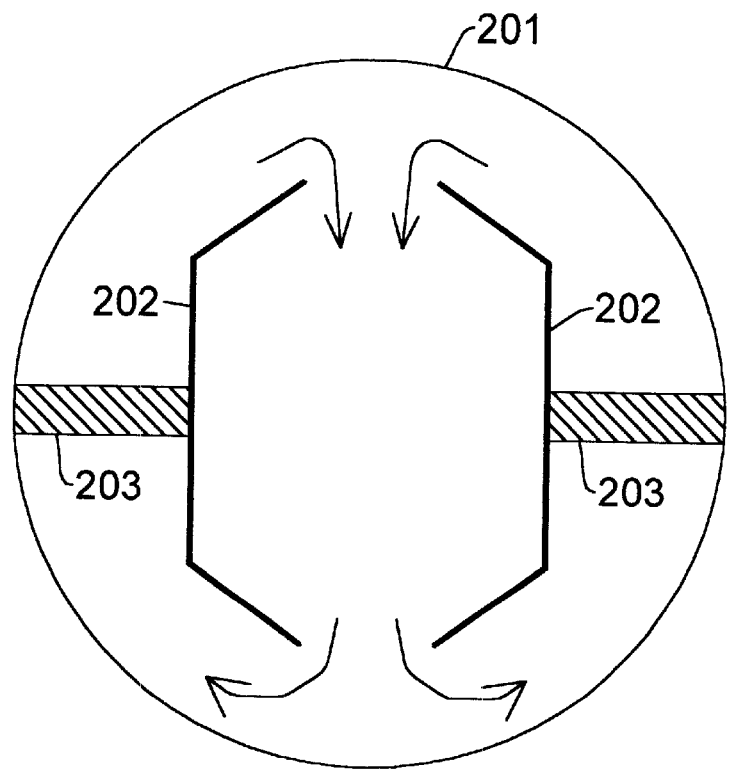
FIG. 2 is a plan view of a CD tray having downcomers only in the diverged streams, thereby leaving a clear (unobstructed) central tray section.

In FIG. 2, a similar tray 201 and tray partitions 202 are provided, but with tray downcomers 203 located in the peripheral sections instead of the central section.

Figure 3:
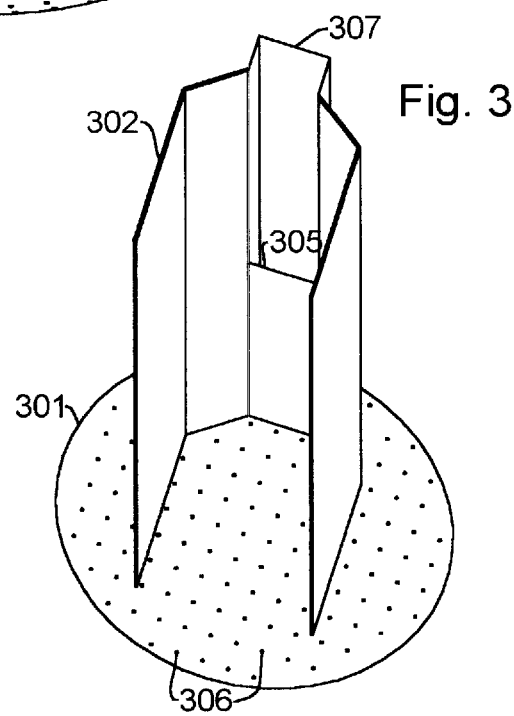
FIG. 3 is a perspective view of a CD tray, with the tray downcomer at the end of the converged stream flowpath.

FIG. 3 is a perspective view of a convergent-divergent tray comprised of vapor injection tray 301, tray partitions 302, tray weir 305, and baffle 307. The tray is depicted as a sieve tray, i.e., with orifices 306 for vapor injection.

However, any other know type of injector could be used: valve trays, bubble caps, pins, slots, V-grids, and the like.

Figure 4:
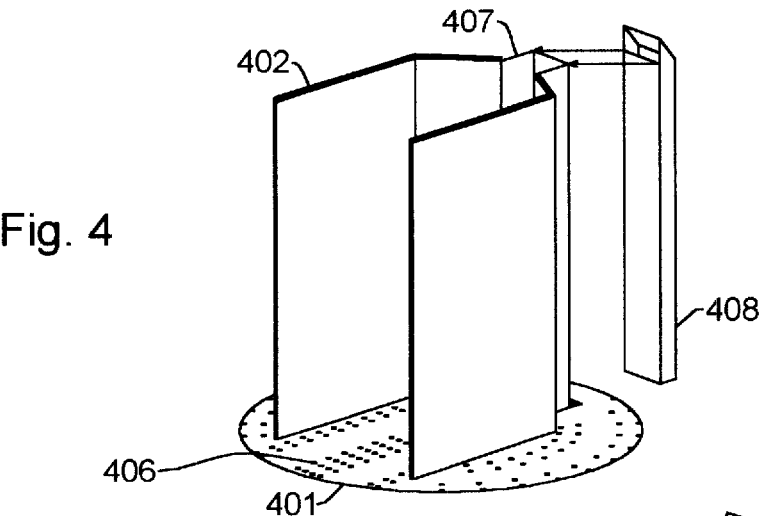
FIG. 4 illustrates one method of incorporating an integrated tray downcomer into the FIG. 3 tray.

FIG. 4 illustrates one type of downcomer 408 which is advantageously used with this type of tray. The top diagonal section of the downcomer protrudes through the tray above tray 401. A similar downcomer protrudes through tray 401, immediately below downcomer 408.

Figure 5:
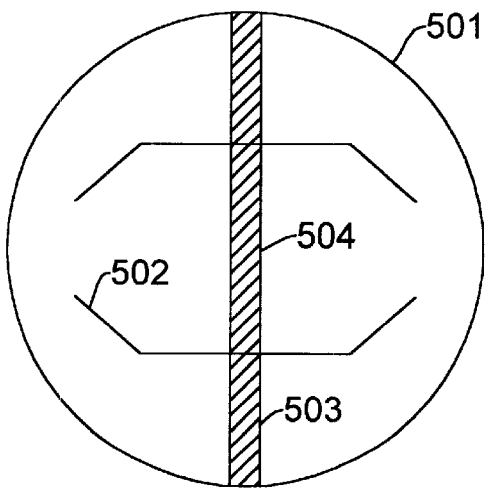
FIG. 5 is a plan view of a 2-pass CD tray, having weir length equal to one tray diameter (1D).

FIG. 5 is a plan view of a CD tray having both a central section tray downcomer 504 and peripheral section tray downcomers 503. Thus, there are two separate liquid paths across the tray (2 pass) and the total weir length is one tray diameter (1D).

Figure 6:
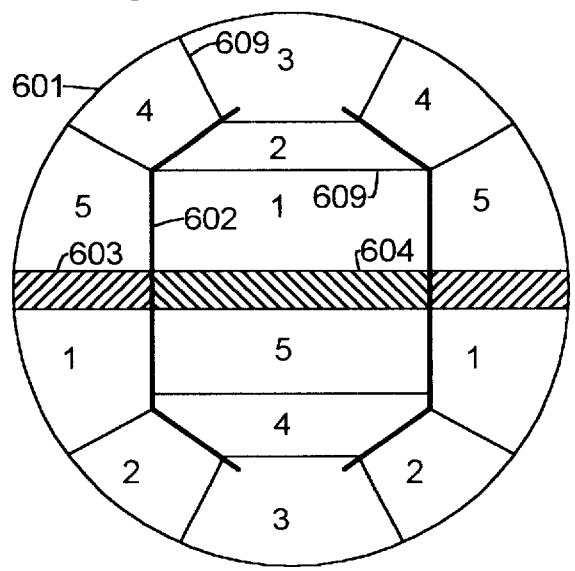
FIG. 6 illustrates the application of horizontal staging to the FIG. 5 tray—five horizontal compartments in each liquid pass.

FIG. 6 is a plan view of the FIG. 5 tray with horizontal staging added in each liquid path. Compartment partitions 609 divide each liquid path into five numbered sequential compartments.

Figure 7:
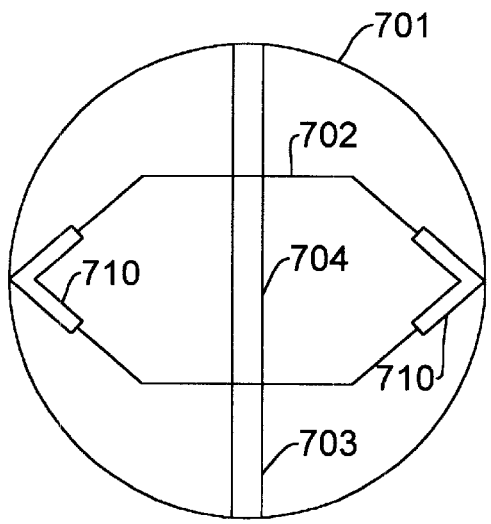
FIG. 7 is a plan view of a 4-pass CD tray, having 2D weir length.

FIG. 7 illustrates a CD tray with additional weir length, and four passes, in order to accommodate higher liquid loadings and/or larger tray diameters. The weir length is increased to 2D, by addition of tray downcomers 710. Other numbered components bear descriptions similar to correspondingly numbered earlier components.

Figure 8:
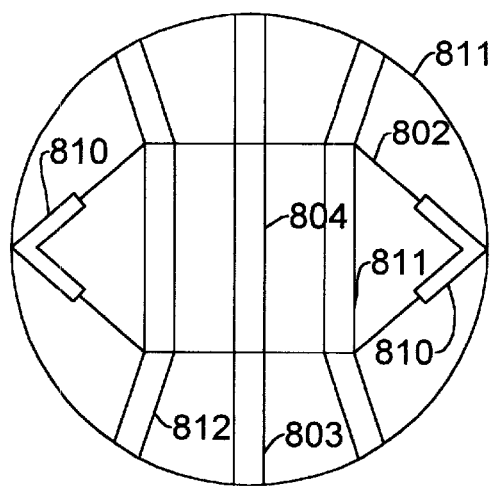
FIG. 8 is a plan view of an 8-pass CD tray, having 4D weir length.

FIG. 8 further increases the liquid loading capability by adding tray downcomers 81 1, making the tray 8 pass and with 4D-weir length.

Horizontal compartmentation, such as illustrated in FIG. 6, can be applied to any of the CD tray configurations, FIGS. 1–9, in order to increase tray efficiency beyond the point efficiency. However, in order to increase tray vapor capacity, it is necessary to add structure in each compartment which gives rise to local co-currency (of the vapor-liquid froth) coupled with vapor-liquid separation and liquid recirculation. For ease of illustration, the advantageous compartment geometries are illustrated, as though the sequential liquid path across the tray through the compartments were a straight line, even though in many cases it is a curved path.

Referring to FIG. 9, portions of two parallel flow trays 901 are shown, including two tray downcomers 915 on each tray, and four horizontal compartments between each pair of downcomers, defined by compartment partitions 913. Each compartment is enhanced by a diagonal compartment weir 914, thus forming a downcomer with smaller cross-section at the bottom than at the top. Opening 919 at the bottom of the compartment weir 914 allows liquid recirculation into the same compartment, whereas opening 920 in the bottom of partition 913 allows advancement of liquid to the next compartment. Each tray downcomer has a diagonal section 916 at the top which seals between liquid departing the tray and liquid arriving at the tray. The maximum enhancement in vapor capacity is obtained when there is additionally vapor-liquid separation media 918 above the riser section of each compartment, which drains separated liquid into the compartment downcomer.

Figure 10:
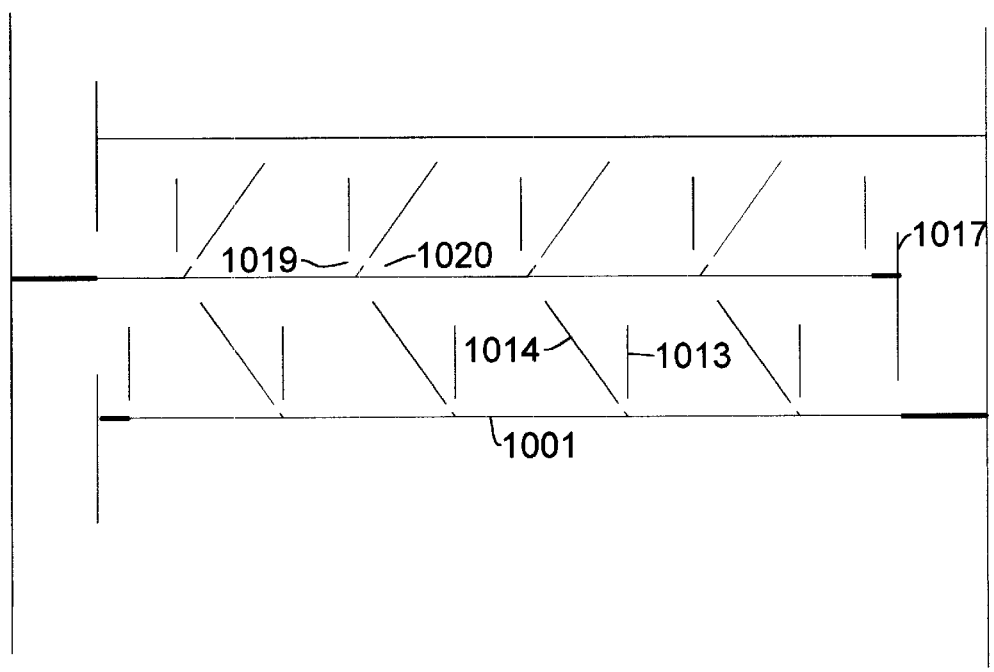
FIG. 10 is a different embodiment of the intensified LCLR compartment, having diagonal compartment partitions which function as froth deflectors, and having opposite direction liquid flow across each tray.

FIG. 10 illustrates that the same horizontal compartmentation with enhanced vapor loading capability can be applied to conventional reverse flow trays. Liquid flows over tray downcomer 1017 onto tray 1001, and then encounters vertical compartment weirs 1013 and diagonal compartment partitions 1014. The compartment partitions do not extend all the way to the tray above, since vapor mixing between compartments is beneficial with reverse direction flow. Note that there is an added benefit when the compartment partition is diagonal—the co-current flow in the riser is also diagonal, giving it a longer residence time and easier separation. As in all cases, both the compartment partitions 1014 and compartment weirs 1013 have liquid passages near the bottom, 1019 and 1020.

Figure 11:
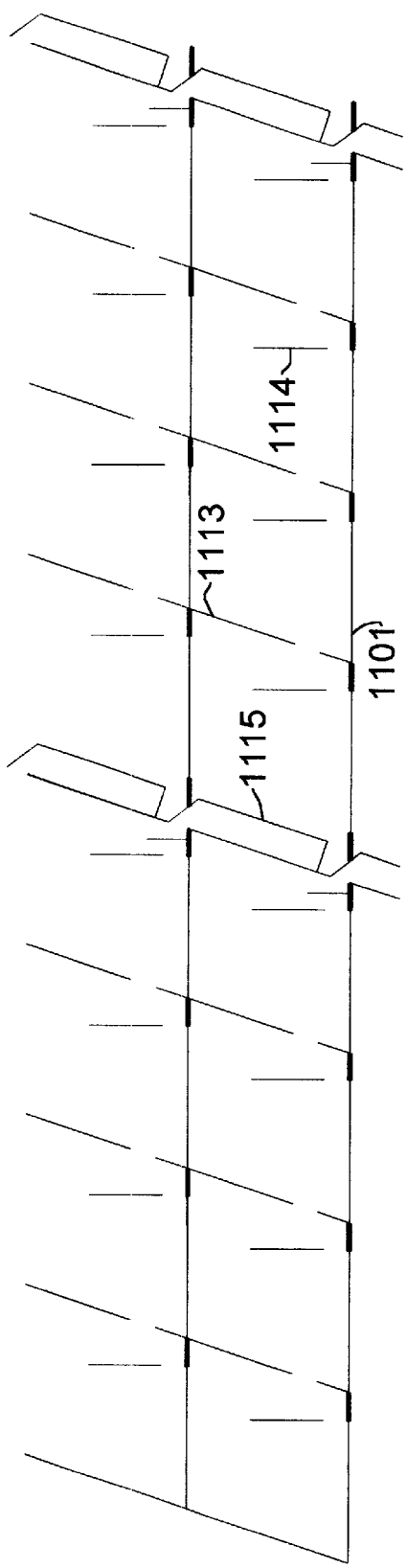
FIG. 11 is an elevation view of the intensified LCLR compartments with diagonal partitions functioning as froth deflectors, in same direction flow, and with integrated tray downcomers.
Figure 12:
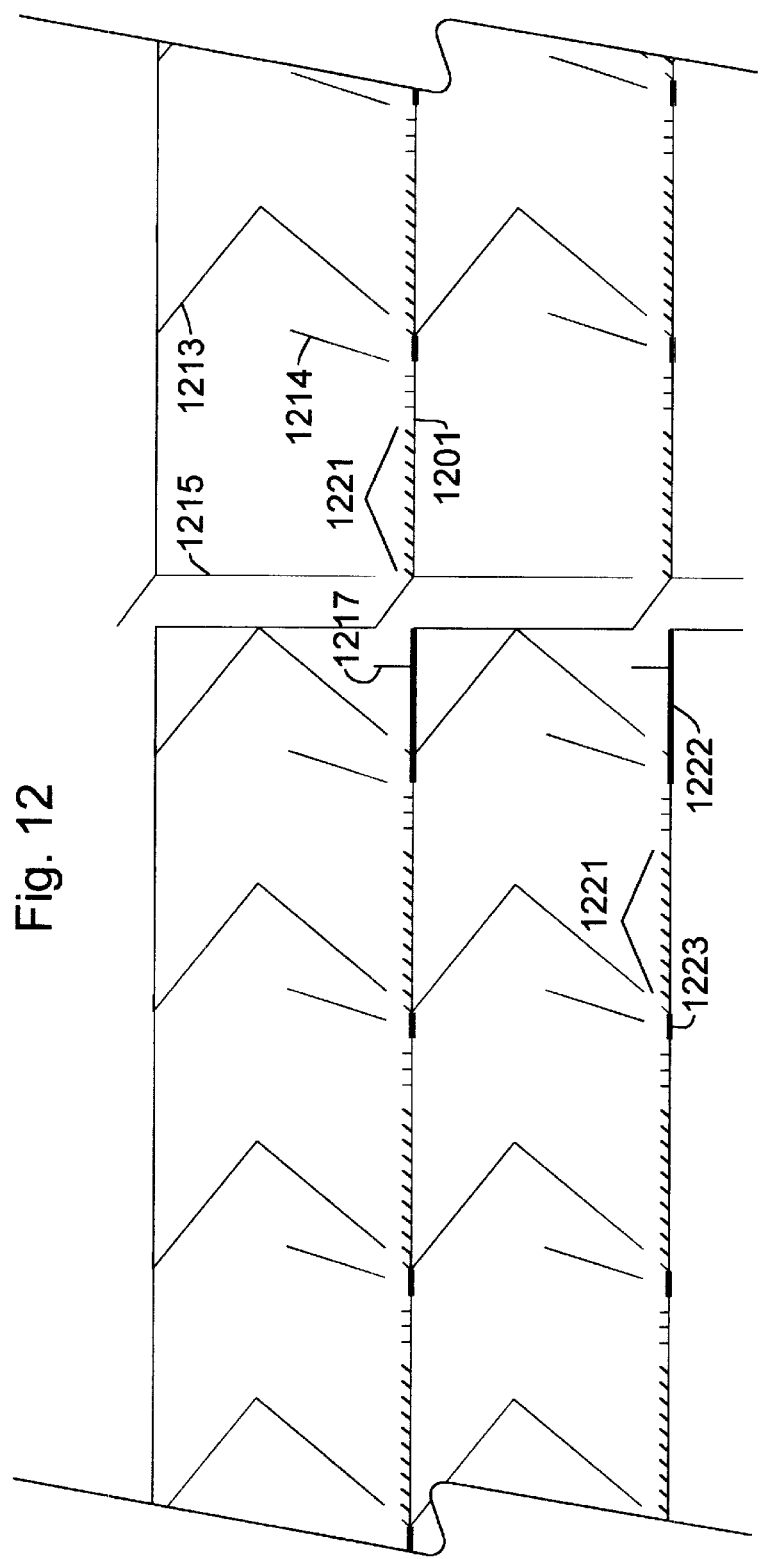
FIG. 12 is an elevation view of same direction intensified LCLR compartments with double diagonal compartment partitions.

FIG. 11 illustrates that the desirable diagonal partitions can also be applied to same direction flow trays. However, they create a small difficulty, in that now the compartments and tray downcomers are no longer in the identical location on each tray, but slowly advance around the tray for each succeeding one. FIG. 12 illustrates how that problem can be solved. The partitions are made doubly diagonal—diagonal in one direction up to somewhat above the top of weir 1214, and then diagonal in the other direction back to their starting point. Advantageously, the vapor injectors 1221 adjacent the diagonal partition have a directionality which helps launch the two-phase mixture in its diagonally co-current flow. One means of providing that directionality is with slotted sieve trays. Other standard features with these horizontal compartments are small areas where the vapor injectors are blocked so as to not send vapor up downcomers, i.e., 1222 and 1223.

Figure 13:
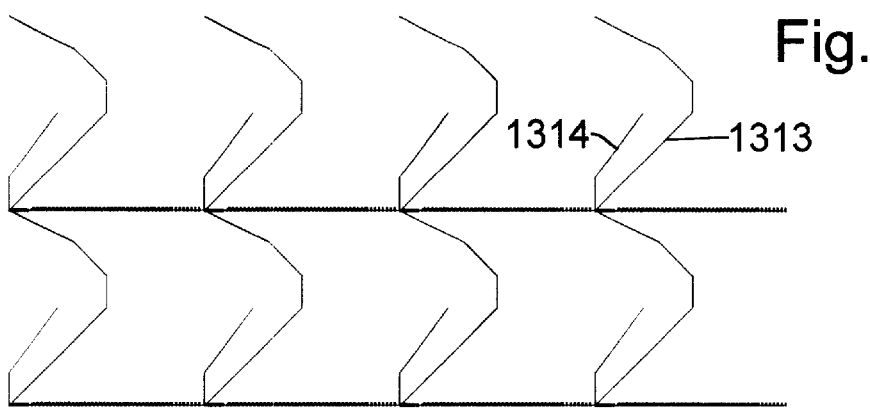
FIG. 13 is a side elevation view of portions of two trays which have horizontally-staged diagonally co-current liquid recirculating (DCLR) compartments.

FIG. 13 illustrates a more enhanced version of the double diagonal locally co-current liquid recirculating compartments. Both the compartment partitions 1313 and the compartment weirs 1314 are shaped to provide maximum tray active area, plus maximum vapor-liquid separation tendency.

Figure 14:
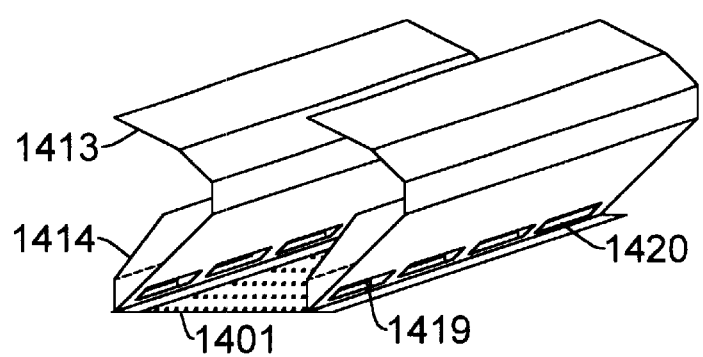
FIG. 14 is a perspective view of the multi-diagonal compartment partitions and compartment weirs which comprise the DCLR compartments.

FIG. 14 is a perspective view of the same compartmentation, illustrating how the partition 1413 and weir 1414 can be fashioned into essentially free-standing downcomers, which can be located anywhere on the tray 1401. Of course, the sequential location from tray downcomer to tray downcomer provides the best overall performance.

Figure 15:
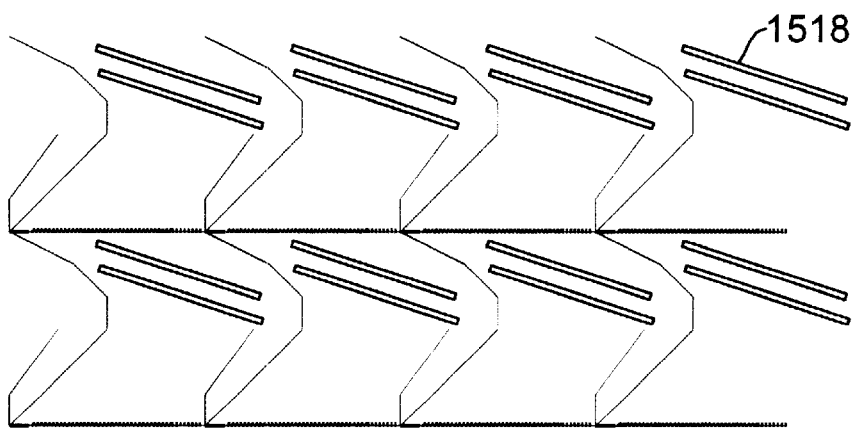
FIG. 15 illustrates how vapor-liquid separation media, such as pans, can be added to the FIG. 13 embodiment.

FIG. 15 illustrates that vapor-liquid separation media 1518 can be added to these highly enhanced DCLR compartments as well.

Figure 16:
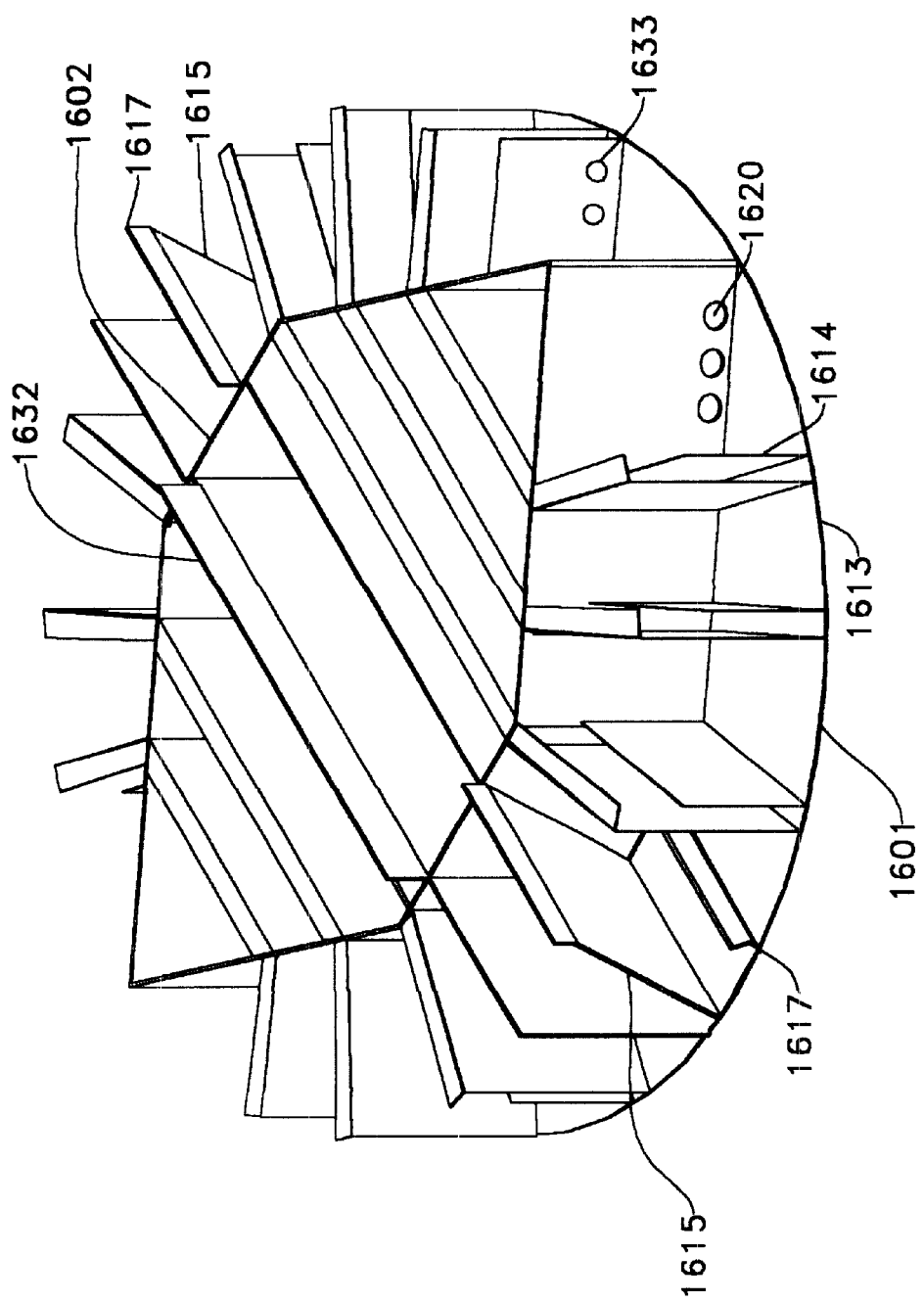
FIG. 16 is a perspective view of a CD tray with ID weir and with horizontally-staged LCLR compartments.

FIG. 16 is a perspective view of a CD tray with two passes, 1D weir length, horizontally-staged with LCLR compartments in each pass. Tray weirs 1617 and tray downcomers 1615 send liquid to the lower tray.

The CD tray configuration makes possible a completely unobstructed tray center line (FIG. 2). This makes this configuration readily adaptable to placing partitions on some trays, i.e., a dividing wall column. Alternatively, FIGS. 1 and 3 are particularly well adapted to placing heat exchange coils on the tray, in counterflow relationship to the tray liquid, thus achieving highly beneficial diabatic distillation. Combinations of the two are also possible.

The CD tray configuration provides a very orderly horizontal staging opportunity: the horizontally spaced compartments have nearly identical active areas, and also very similar widths, thus achieving a close approach to plug flow and to equal concentration change increments in each compartment. This maximizes the horizontal staging benefit, i.e., achieves the greatest possible increase in tray efficiency over point efficiency.

The number of tray weirs can be increased with the CD tray configuration to any number consonant with the liquid loading and the tray diameter. In general, liquid flowpath lengths in the range of 0.5 to 2.5 m are preferred. Tray diameters from 0.1 to 1.5 m are envisioned, with tray spacing between 0.1 and 0.6 m. Horizontal compartment widths between 0.1 and 0.4 m are preferred. Compartment weir heights on the order of 0.4 to 0.6 of the tray height are preferred.

Vapor loadings on the order of double that achieved in conventional crossflow columns are believed to be achievable with enhanced DLCR compartments, with no more than 10% increase in tray pressure drop (provided the injector area is proportionately increased). That, coupled with much higher tray efficiency and hence reduced tray count results in an actual reduction in column pressure drop. Hence, the combination of disclosed features synergistically overcomes all of the major limitations to column performance simultaneously.

The horizontal compartments are generally all very similar in function and in construction, except there may be some dissimilarities as illustrated in the compartments where liquid enters and exits the tray. Structurally integrated downcomers are illustrated in FIGS. 4, 9, 11, and 12. The active bubbling area of the tray is maximized generally, and especially with the DCLR configuration.

What is claimed is:

1. A vapor-liquid contact tray of the crossflow type comprised of two tray partitions which extend from the bottom to the top of the tray and which divide the tray area into a central section plus two outer portion; vapor injection openings in all three of said tray areas; plus at least one structurally integrated tray downcomer which separates the fluid entering the tray from the fluid exiting the tray and which is located in at least one of said central section and said outer portion.

2. The apparatus according to claim 1 wherein said tray downcomer is structurally integrated with the tray downcomer from a tray above it.

3. The apparatus according to claim 1 additionally comprised of a multiplicity of liquid recirculating downcomers in all three of said tray areas.

4. The apparatus according to claim 3 wherein said liquid recirculating downcomers are inclined in the direction of liquid crossflow across the tray.

5. Apparatus according to claim 1 wherein said structurally-integrated downcomer is located in the central section of said tray, and wherein it extends from one tray partition to the other, and from the tray to a tray above it, so as to prevent direct mixing of the vapor on the two sides of said downcomer.

6. Apparatus according to claim 1 wherein a structurally integrated downcomer is located in each outer portion of said tray.

* * * * *